(No Model.)
P. CACCIATORI.
FREEZER.
No. 512,002.   Patented Jan. 2, 1894.
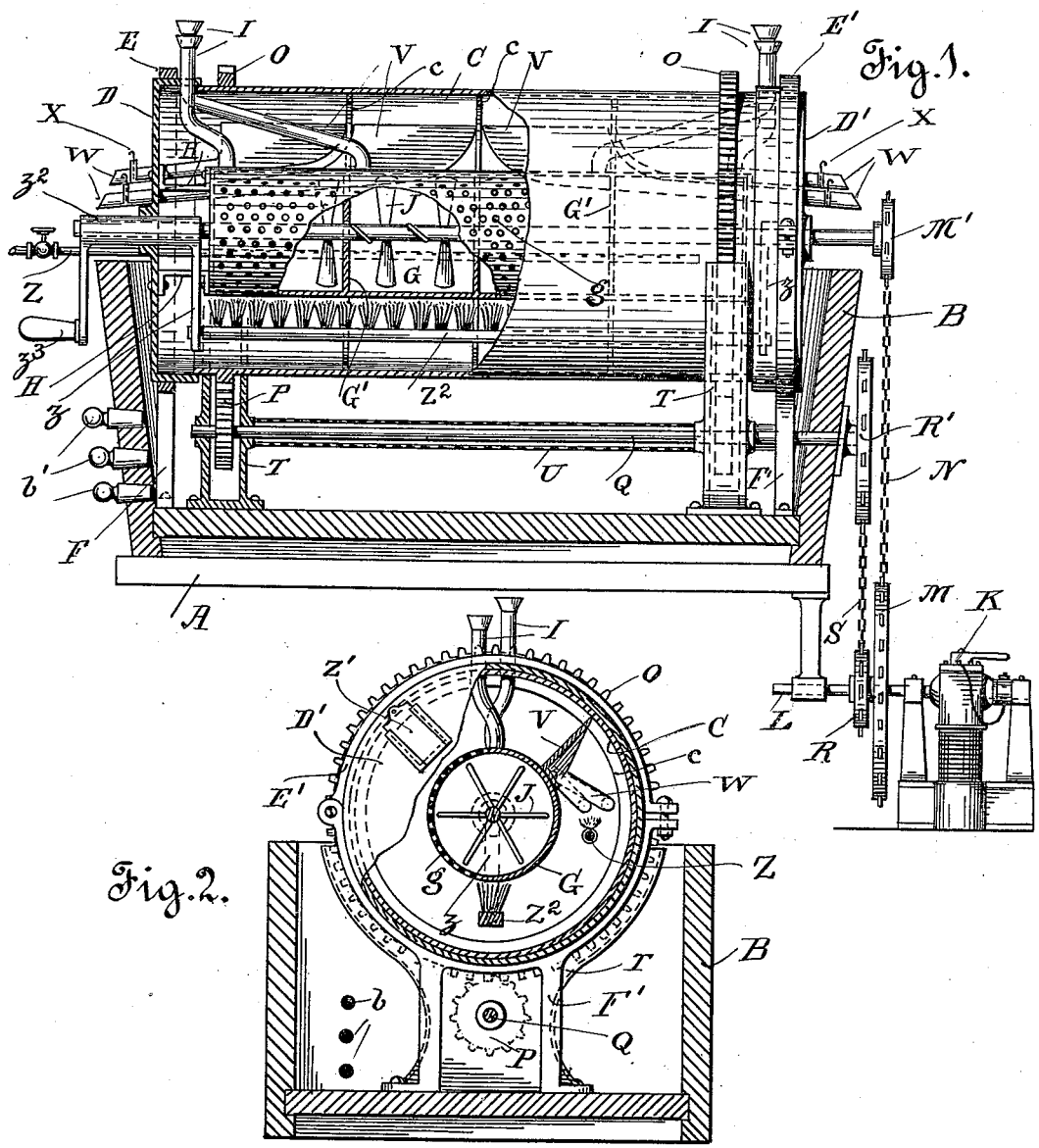

UNITED STATES PATENT OFFICE.

PETER CACCIATORI, OF CHICAGO, ILLINOIS.

FREEZER.

SPECIFICATION forming part of Letters Patent No. 512,002, dated January 2, 1894.

Application filed June 30, 1893. Serial No. 479,310. (No model.)

*To all whom it may concern:*

Be it known that I, PETER CACCIATORI, of Chicago, county of Cook, and State of Illinois, have invented certain new and useful Improvements in Freezers, of which the following is a specification.

This invention has for its object improvements in machines or apparatus for making sorbets, punches, ice-cream, and water-ices.

Referring to the accompanying drawings, for a detailed description of my invention,— Figure 1 is a side elevation, partly in section, of the whole apparatus, including an electric motor for operating the same. Fig. 2 is a vertical cross-section taken from the right of Fig. 1, looking to the left.

A represents a base plate or table upon which the apparatus rests.

B is a tub, preferably made of wood, which is to be partly filled with a freezing compound made up of ice, sea-salt, niter, nitrate of ammonia, or any other suitable refrigerant. Small holes $b$ stopped by plugs $b'$ are provided in one end of this tub to allow the melted ice and other liquid matter to run out, so that the proper quantity of refrigerant may be maintained and the freezer kept at a constant temperature.

Within the tub B is mounted a hollow cylinder C partly sunk or immersed and adapted to turn in the freezing compound therein. This cylinder is held up by flanged disks or heads D D' that are clasped or held fast by hoops or metallic bands E E' projecting upwardly from iron horses or supports F F' bolted to the bottom of the tub. The hoops E E' are made in two parts hinged and fastened together, substantially as shown in Fig. 2, so that they may be taken apart and the cylinder and heads removed from the tub whenever it is necessary to clean the latter or arrange the freezing compound in it.

G is another hollow cylinder which is centrally supported within the cylinder C by means of bars or brackets H secured to the inner sides of the heads D D' and is therefore stationary. It is perforated on one side, as at $g$, and divided by partitions G' into several compartments into which are poured the various mixtures, compounds, or confections that it is desired to congeal. To these compartments lead feed-pipes I down which the substances to be frozen are poured.

J designates a rotary beater composed of blades set about a stem that passes through the various compartments of the inner cylinder G. This beater serves to stir up the substances poured into the inner cylinder and throw the same out in a spray, jets, or small particles through the perforations $g$ onto the inner surface of the outer cylinder while the latter turns in the freezing compound. It is briskly revolved by means of a small electric motor K through the medium of a shaft L, sprocket-wheels M M', and a chain N. The cylinder C is turned also by the same motor, but very slowly, through the agency of cog-wheels O P, a shaft Q, and sprocket-wheels R R' and chain S connecting said shaft with the shaft L. A suitable inclosure or housing T is provided in the tub for the cog-wheels O P to prevent the refrigerant from falling onto them and interfering with their proper action. A tube U inclosing the shaft Q may also be used for the same purpose. The electric motor may be replaced, if desired, by a steam or gas-engine or any other suitable prime mover, and small freezers for private use may be arranged to work by hand. The matter thrown from the perforated side of the inner cylinder becomes congealed upon coming in contact with the outer cylinder or while the latter is slowly turned in the refrigerant and is brought up by it in separate compartments, divided by annular ridges $c$ and corresponding to the compartments of the cylinder G, to knives V and delivery-pipes W connected therewith. The knives V scrape off and gather the matter thus thrown and congealed and being curved up or otherwise arranged to guide it let it down into the deliver-pipes, which carry it to both ends of the freezer, where it is received in glasses upon lifting a small gate or slide X. A scraper not shown, is used to clear the pipes W whenever the congealed substances stick to them and do not come out readily. A gas burner Z running through the freezer may also be used to throw out or warm up the pipes W or modify the temperature in the freezer in case the confections should be frozen too hard for the purpose in view. For the same purpose a shutter or slide-gate Z' may be opened to admit warm air into the freezer, whenever it is found desirable.

$Z^2$ represents a metallic brush which is used to clean the cylinder G and prevent the perforations therein from becoming stopped up by the matter passing through. This brush is held up to the under side of the cylinder G by means of hangers $z$ depending from sleeves $z^2$ that are loosely fitted over the ends of the beater's stem. A handle $z^3$ enables one to swing the brush back and forth about the outer surface of the perforated cylinder.

It will be observed that several different kinds of mixtures or confections may be frozen at the same time in the above-described machine. Various confections may thus be turned out at one operation to suit the taste of different customers. The freezing is effected in a minute or two and a patron may have the pleasure of seeing the work performed under his own eyes, the confections entering the machine at the top in a liquid or semi-liquid state and soon after coming out at the ends in a frozen condition.

Having now described my invention, what I claim, and desire to secure by Letters Patent of the United States, is—

1. The combination of a perforated receptacle, a refrigerating vessel movable about the same, and a beater or stirrer to throw out substances to be congealed or frozen from said receptacle to said vessel, substantially as set forth.

2. The combination of a partitioned receptacle adapted to receive substances to be frozen, a refrigerating vessel, and means to throw out the substances from the compartments of the receptacle to suitable places in the refrigerating vessel, substantially as set forth.

3. The combination of a receptacle for matter to be frozen, a rotatable refrigerating vessel, means to throw the matter in a spray, jets, or particles from the receptacle to the vessel, and knives to scrape off or gather the matter cast out after it is frozen, substantially as set forth.

4. The combination of a perforated receptacle, a refrigerating vessel turning around the same, means to throw matter to be frozen from said perforated receptacle to said refrigerating vessel, knives to take up the frozen matter, and delivery devices, such as pipes, connected with said knives, substantially as set forth.

5. The combination of a receptacle perforated on one side, knives mounted on the opposite side thereof, means to throw out matter to be frozen from said receptacle, and an outer refrigerating cylinder adapted to receive and congeal the matter cast out and deliver the same to said knives, substantially as set forth.

6. The combination of a refrigerating vessel, a perforated receptacle therein, means to force out matter to be frozen through the perforations of said receptacle to said vessel, and a brush movable about said perforations and adapted to clean the same, substantially as set forth.

7. The combination of a tub containing a freezing compound, a rotary partitioned vessel mounted in stationary heads therein, a correspondingly-divided perforated receptacle rigidly secured to said heads within said rotary vessel, feed-pipes leading to the compartments of said perforated receptacle, a beater or stirrer for matter fed through said pipes, and scraper-knives and delivery tubes taking up the matter thrown out by said beater or stirrer, substantially as set forth.

In testimony whereof I affix my signature in presence of two witnesses.

PETER CACCIATORI. [L. S.]

Witnesses:
G. L. BLACKBURN,
LOUIS L. BLOCK.